(12) United States Patent
Laboy

(10) Patent No.: US 10,005,364 B1
(45) Date of Patent: Jun. 26, 2018

(54) VEHICLE ALTERNATIVE POWER SYSTEM

(71) Applicant: Roberto Laboy, Indianapolis, IN (US)

(72) Inventor: Roberto Laboy, Indianapolis, IN (US)

( * ) Notice: Subject to any disclaimer, the term of this patent is extended or adjusted under 35 U.S.C. 154(b) by 0 days. days.

(21) Appl. No.: 15/133,071

(22) Filed: Apr. 19, 2016

Related U.S. Application Data

(60) Provisional application No. 62/264,575, filed on Dec. 8, 2015.

(51) Int. Cl.
| | |
|---|---|
| *B60L 11/18* | (2006.01) |
| *B60L 8/00* | (2006.01) |
| *B60K 1/02* | (2006.01) |
| *B60L 3/00* | (2006.01) |
| *F03D 9/25* | (2016.01) |
| *B60K 16/00* | (2006.01) |

(52) U.S. Cl.
CPC ............ *B60L 8/006* (2013.01); *B60K 1/02* (2013.01); *B60L 3/0061* (2013.01); *B60L 11/1812* (2013.01); *B60L 11/1864* (2013.01); *F03D 9/255* (2017.02); *B60K 2016/006* (2013.01); *B60L 2220/42* (2013.01); *F05B 2240/941* (2013.01)

(58) Field of Classification Search
CPC .. B60L 11/18; B60L 11/1861; B60L 11/1868; B60L 11/1864; B60L 11/1811; B60L 3/0046; B60L 2220/42; B60L 2260/28
See application file for complete search history.

(56) References Cited

U.S. PATENT DOCUMENTS

| | | | |
|---|---|---|---|
| 3,876,925 A | 4/1975 | Stoeckert | |
| 2001/0026142 A1* | 10/2001 | Furukawa | B60W 10/26 320/103 |
| 2001/0049571 A1* | 12/2001 | Shimizu | B60K 6/28 701/22 |
| 2002/0064697 A1* | 5/2002 | Sugiura | B60L 11/1881 429/431 |
| 2005/0052080 A1 | 3/2005 | Maslov | |
| 2011/0017529 A1 | 1/2011 | Durney | |

* cited by examiner

*Primary Examiner* — Bryan A Evans
(74) *Attorney, Agent, or Firm* — RG Patent Consulting, LLC; Rachel Gilboy

(57) ABSTRACT

Vehicle alternative power system is a power and generating system for an electric vehicle that allows the vehicle to self-generate power for propulsion of the vehicle eliminating the use of fossil fuel thereby improving the natural state of the environment.

19 Claims, 4 Drawing Sheets

VEHICLE ALTERNATIVE POWER SYSTEM

CROSS-REFERENCE TO RELATED APPLICATION

The present application is related to and claims priority from prior provisional application Ser. No. 62/264,575, filed Dec. 8, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of electric cars and more specifically relates to vehicle alternative power system.

2. DESCRIPTION OF THE RELATED ART

It is very evident that we must reduce our dependency on fossil fuels for powering the vehicles we drive. At the rate that fossil fuel powered vehicles are being manufactured globally, the certainty of a degradation of the environment and atmosphere will occur at some point in the future. Some large cities have masses of gridlocked vehicles for portions of the business day with each vehicle contributing to air pollution. The vast majority of vehicles are fossil fuel powered since alternatively powered vehicles lack in practicality due to limited travel distances and the lack of supporting infrastructure. Fossil fuel is expensive and makes countries beholden to the foreign countries that provide the fuels. Many drivers attempt to do their part to improve our environment and lessen our dependence on petroleum-based products by driving hybrid or electric vehicles but hybrid vehicles still use gasoline even though able to drive many more miles on a gallon because of the unique design of their vehicles. Generally electric vehicles need to be connected to a charger after use to restore battery power and can only go a limited number of miles between charges. Both types of vehicles are constrained by the amount of energy or power that can be stored in their batteries. An improvement is needed.

Various attempts have been made to solve the above-mentioned problems such as those found in U.S. Pat. No. 3,876,925 to Christian Stoeckert, U.S. Pub No. 2005/0052080 to Boris Maslov, and U.S. Pub No. 2011/0017529 to Edward Gordon Durney. This art is representative of electric cars. None of the above inventions and patents, taken either singly or in combination, is seen to describe the invention as claimed.

Ideally, an electric car should provide extended distances between charging, and yet, would operate reliably and be manufactured at a modest expense. Thus, a need exists for a reliable vehicle alternative power system to avoid the above-mentioned problems.

BRIEF SUMMARY OF THE INVENTION

In view of the foregoing disadvantages inherent in the known electric car art, the present invention provides a novel vehicle alternative power system. The general purpose of the present invention, which will be described subsequently in greater detail, is to provide a extended travel distances at a greatly reduced cost while generating on-board power.

A vehicle alternative power system preferably comprises an ignition switch, at least one battery(s), a regulator, a multi-sensor relay box, an alternator, a generator, a coil, a first motor and a second motor, and a central processing unit having a software control program. The central processing unit is in communication with the ignition switch, the battery(s), the regulator, the multi-sensor relay box, the alternator, the generator, the coil, the first motor, and the second motor.

The ignition switch is structured and arranged to provide electrical power, stored in the battery(s), to the regulator, the multi-sensor relay box, the alternator, the generator, the coil, and the first motor. When the ignition switch is rotated to an off position, all the power ceases to be generated and the power is diverted to at least one cooling fan to dissipate the residual system voltage.

The multi-sensor relay box may comprise a sensor circuit for receiving a proportional voltage from the battery(s), the alternator, the generator, the first motor, and the second motor. The regulator is adapted to regulate the voltage to the first motor and the accessories and is able to regulate a voltage generated by the first motor back to the battery(s) for storage when voltage beyond system operational needs is generated. The regulator transfers the current to power the first motor and the vehicle accessories. The multi-sensor relay box is adapted to receive at least one voltage level signal from the battery(s), the alternator, the generator, the first motor, and the second motor and to transmit a proportional the at least one voltage level signal to the central processing unit for comparison to system current requirement and an allocation of an electrical charge level and for electrical storage reserve. The battery(s), the first motor, the alternator, the generator, and the second motor each comprise at least one the sensor and a corresponding relay. The central processing unit is adapted to proportionately increase the current and the voltage of an operating system voltage requirement and to proportionately decrease current going to storage as a system electrical load increases.

The software control program of the central processing unit receives the proportional voltage from the multi-sensor relay box and is programmed to adjust control voltage and current through the system components to a corresponding sensor circuit of the multi-sensor relay box. The software control program is designed to evaluate the system electrical loads in relation to a charging rate and a storage level condition. The battery(s) may comprise(s) a high capacity storage battery(s) bank. The software control program is preprogrammed to prioritize the system electrical loads according to a safety level and a component criticality. A low the storage level condition and a charging rate is less than the system current requirement, the software control program is adapted to limit the current being supplied to a lowest priority user first. The lowest priority user is also considered non-essential component.

The first motor is adapted to power the alternator. The first motor rotates the alternator and the generator for generating the power for storage and for the operation of the second motor. The first motor further comprises at least one pulley and at least one drive belt for providing a rotational power to the generator and the alternator. The alternator is adapted to provide a voltage to the generator and to the battery(s) for storage as determined via the central processing unit. The generator is designed to receive a voltage from the alternator and increase the voltage value to the coil. The coil is adapted to receive an increased voltage value from the generator and to transform the increased voltage value to a required voltage value as determined by the central processing unit and to transmit the required voltage value to the second motor.

The second motor is adapted to rotate the transmission at a velocity that is determined via the central processing unit and via the user of the vehicle. The second motor is direct coupled to the transmission and may be a variable speed motor. The vehicle alternative power system is useful for powering the electric vehicle with a high degree of efficiency and that a petroleum based fuel is not needed for assisting the operation of the vehicle, and for reducing the frequency of recharging the battery(s).

The present invention holds significant improvements and serves as a vehicle alternative power system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vehicle alternative power system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an electric car and more particularly to a vehicle alternative power system as used to improve the travel distances at greatly reduced costs while generating on-board power.

Generally speaking, vehicle alternative power system is a power and generating system for an electric vehicle that allows the vehicle to self generate power for propulsion of the vehicle eliminating the use of fossil fuel thereby improving the natural state of the environment.

Figure 1:
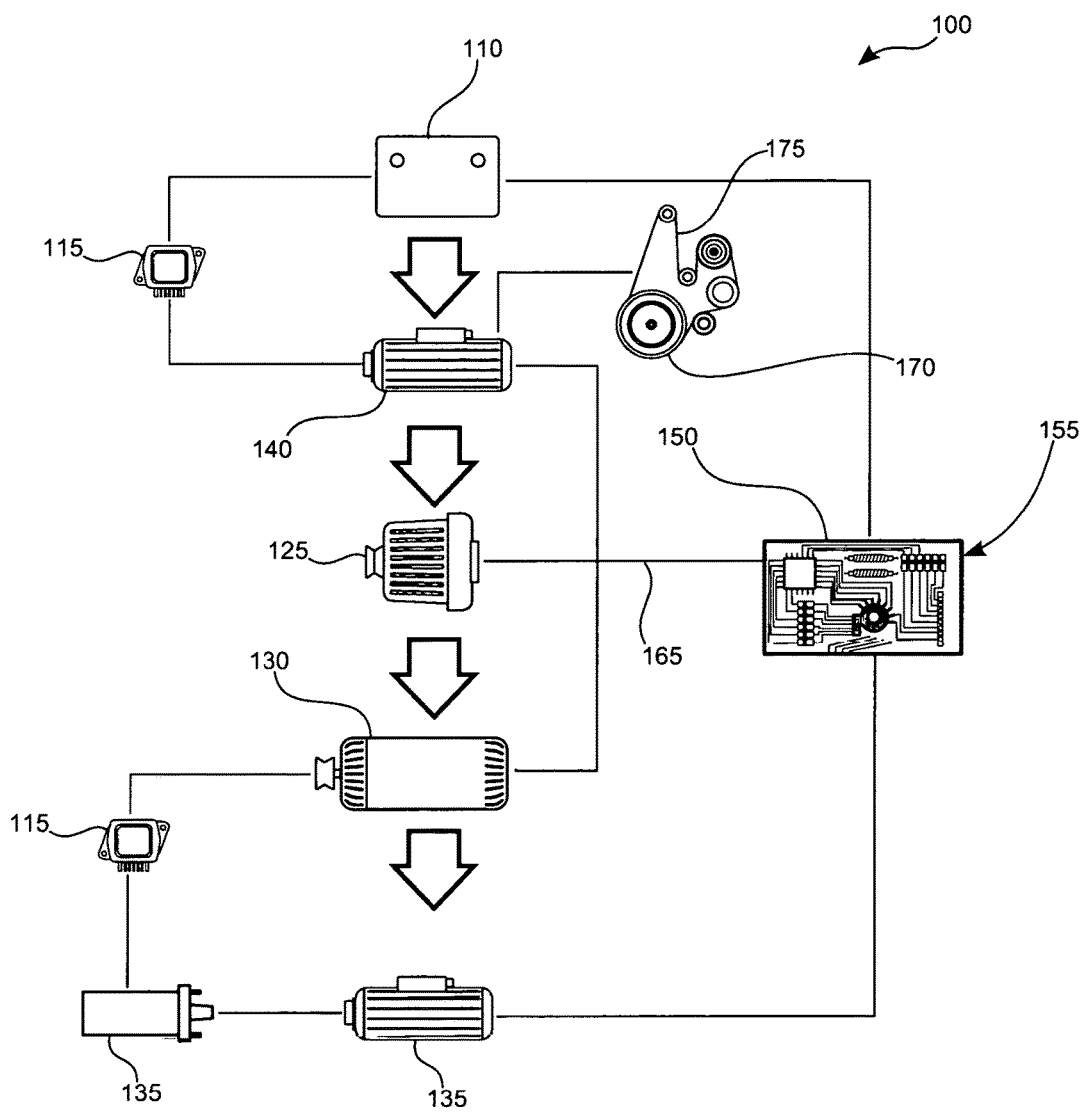
FIG. 1 showing a flow diagram illustrating a preferred embodiment of a vehicle alternative power system according to an embodiment of the present invention.

Referring to the drawings by numerals of reference there is shown in FIG. 1 showing a flow diagram illustrating a preferred embodiment of vehicle alternative power system 100 according to an embodiment of the present invention.

Vehicle alternative power system 100 preferably comprises ignition switch 105, at least one battery(s) 110, a regulator 115, multi-sensor relay box 120, alternator 125, generator 130, coil 135, first motor 140 and second motor 145, and central processing unit 150 having software control program 155. First motor 140 is adapted to power alternator 125. First motor 140 rotates alternator 125 and generator 130 for generating the power for storage and for the operation of second motor 145. First motor 140 further comprises at least one pulley 170 and at least one drive belt 175 for providing a rotational power to generator 130 and alternator 125. Vehicle alternative power system 100 is useful for powering electric vehicle 160 with a high degree of efficiency and that a petroleum based fuel is not needed for assisting the operation of electric vehicle 160, and for reducing the frequency of recharging battery(s) 110.

Figure 2:
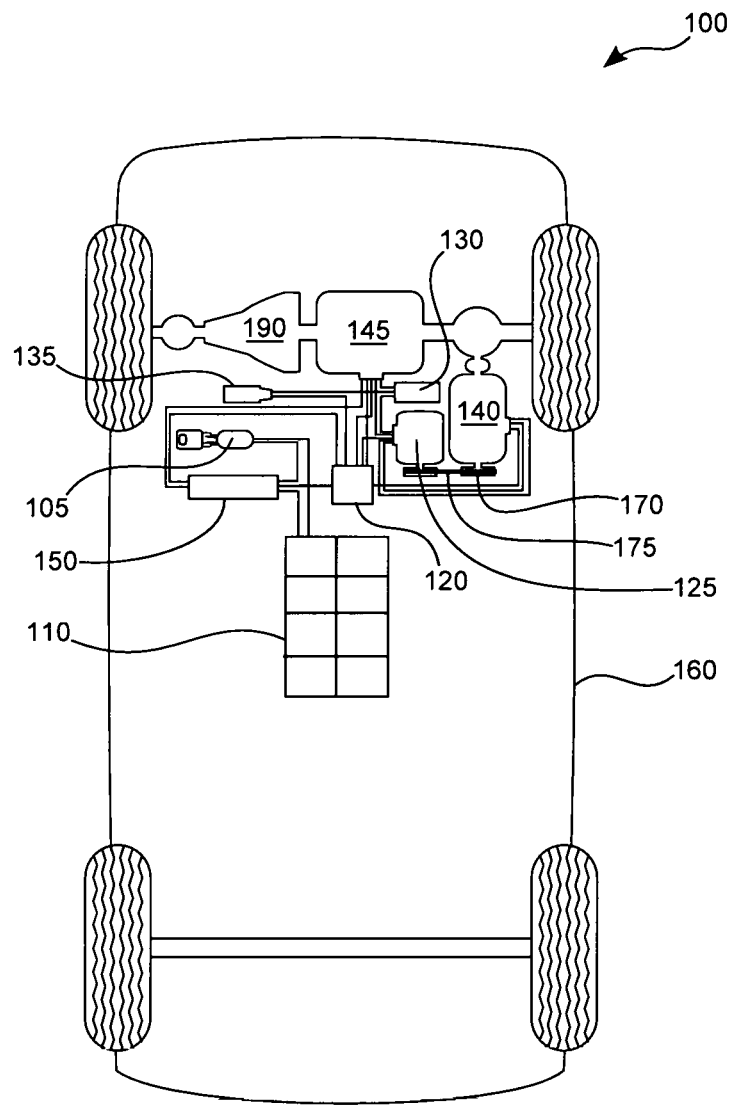
FIG. 2 showing a diagram illustrating a layout within a vehicle of the vehicle alternative power system according to an embodiment of the present invention of FIG. 1.

Referring now to FIG. 2 showing a diagram illustrating a component layout within a vehicle of vehicle alternative power system 100 according to an embodiment of the present invention of FIG. 1.

Regulator 115 is adapted to regulate the voltage to first motor 140 and vehicle accessories 185 and is able to regulate a voltage generated by first motor 140 back to battery(s) 110 for storage when voltage beyond system operational needs is generated. Regulator 115 transfers the current to power first motor 140 and vehicle accessories 185. Multi-sensor relay box 120 is adapted to receive at least one voltage level signal from battery(s) 110, alternator 125, generator 130, first motor 140, and second motor 145 and to transmit a proportional voltage level signal to central processing unit 150 for comparison to system current requirement and an allocation of an electrical charge level and for electrical storage reserve. Battery(s) 110, first motor 140, alternator 125, generator 130, and second motor 145 each comprise at least one sensor circuit 165 and a corresponding relay. Central processing unit 150 is adapted to proportionately increase the current and the voltage of an operating system voltage requirement and to proportionately decrease current going to storage as a system electrical load increases. Battery(s) 110 may comprise(s) a high capacity storage battery(s) 110 bank. Second motor 145 is adapted to rotate transmission 190 at a velocity that is determined via the central processing unit and via the user of electric vehicle 160. Second motor 145 is direct coupled to transmission 190 and may be a variable speed motor.

Figure 3:
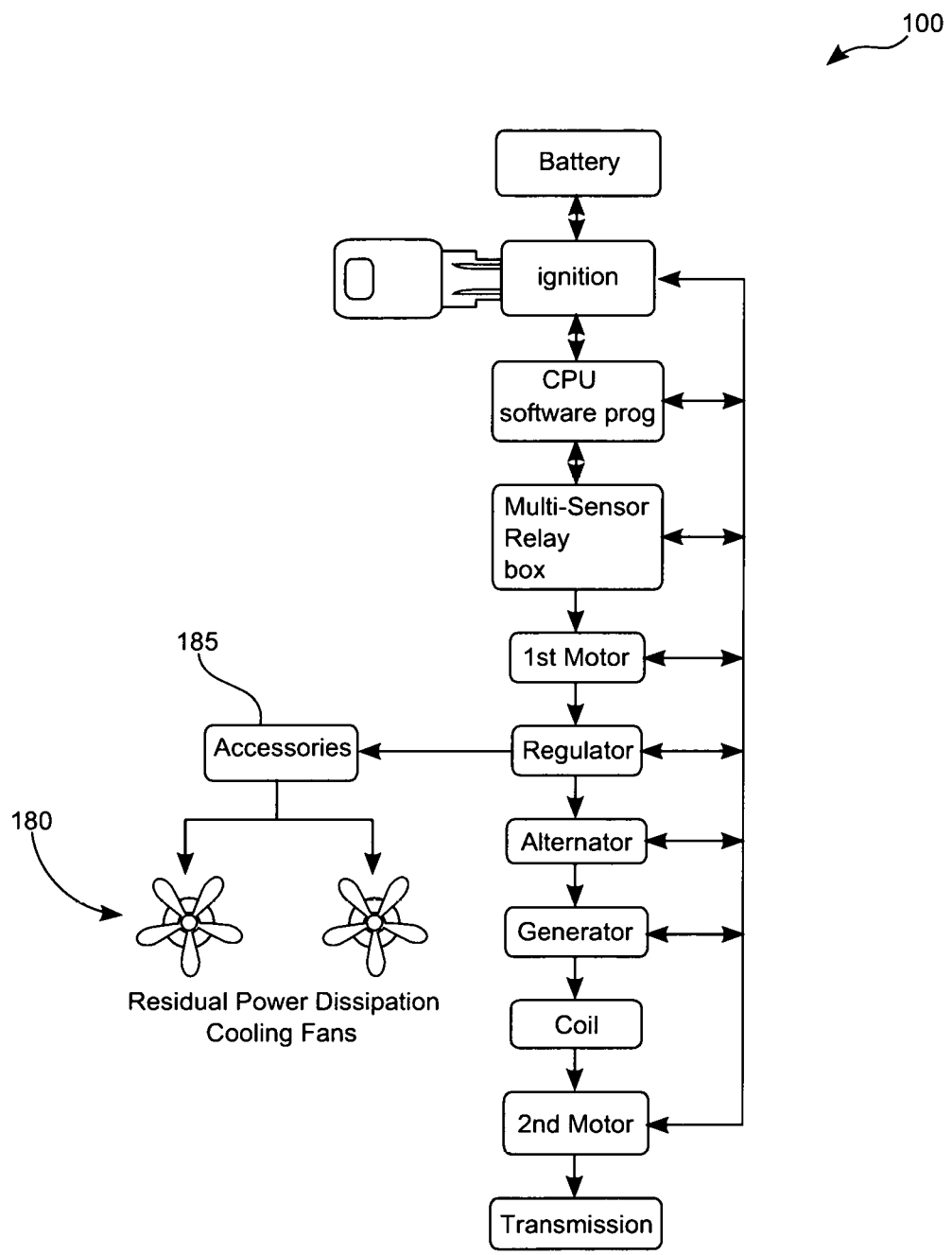
FIG. 3 shows a communication diagram illustrating the vehicle alternative power system according to an embodiment of the present invention of FIG. 1.

Referring now to FIG. 3 shows a communication diagram illustrating vehicle alternative power system 100 according to an embodiment of the present invention of FIG. 1.

Central processing unit 150 is in communication with ignition switch 105, battery(s) 110, regulator 115, multi-sensor relay box 120, alternator 125, generator 130, coil 135, first motor 140, and second motor 145. Ignition switch 105 is structured and arranged to provide electrical power, stored in battery(s) 110, to regulator 115, multi-sensor relay box 120, alternator 125, generator 130, coil 135, and first motor 140. When ignition switch 105 is rotated to an off position, all the power ceases to be generated and the power is diverted to at least one cooling fan 180 to dissipate the residual system voltage. When a low storage level condition and a charging rate is less than the system current requirement, software control program 155 is adapted to limit the current being supplied to the lowest priority user first. The lowest priority user is also considered non-essential component. Alternator 125 is adapted to provide voltage to generator 130 and to battery(s) 110 for storage as determined via central processing unit 150. Generator 130 is designed to receive a voltage from alternator 125 and increase the voltage value to coil 135. Coil 135 is adapted to receive an increased voltage value from generator 130 and to transform the increased voltage value to a required voltage value as determined by central processing unit 150 and to transmit the required voltage value to second motor 145.

Figure 4:
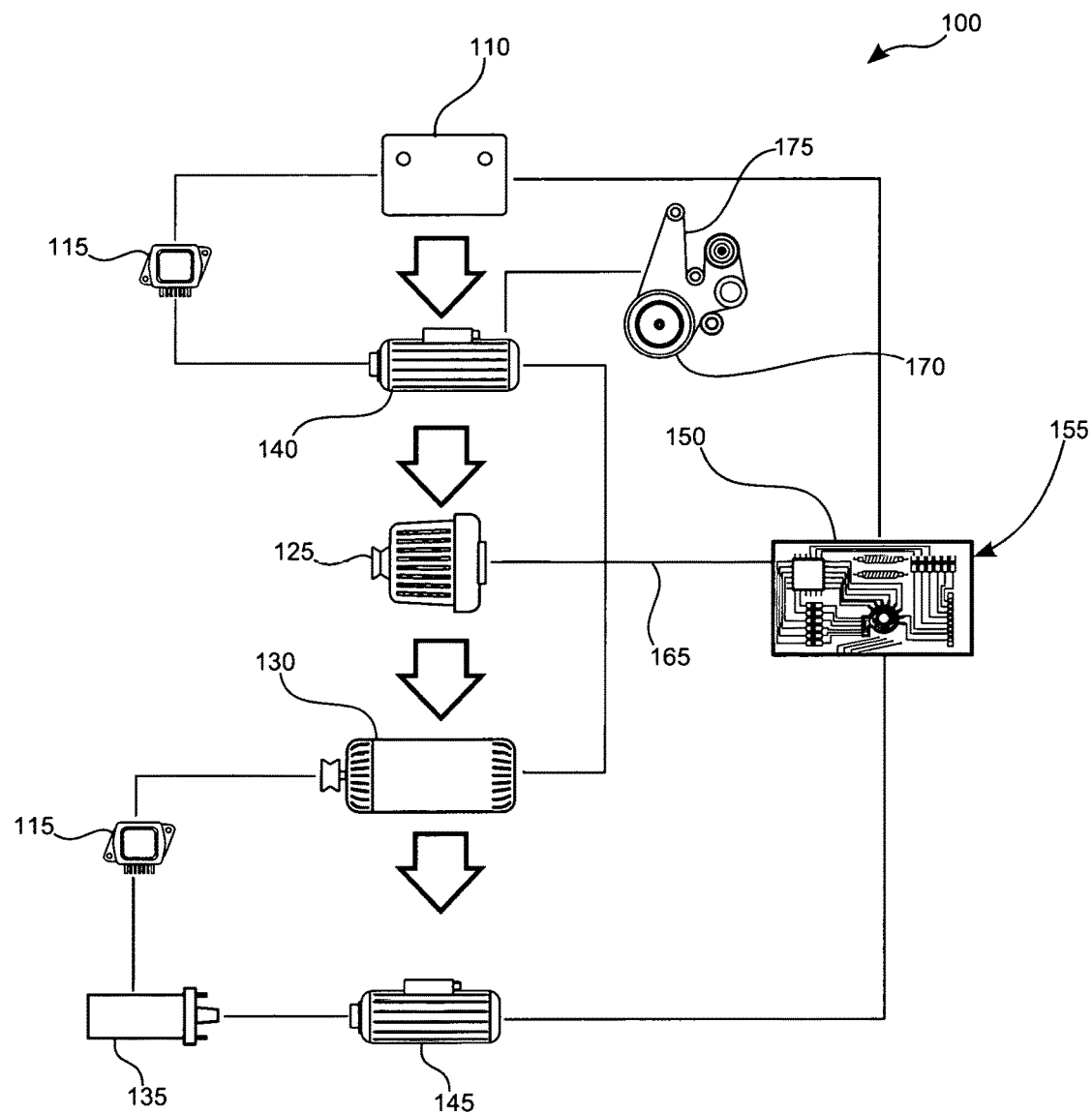
FIG. 4 showing a fourth diagram illustrating the computer and sensor array of the vehicle alternative power system according to an embodiment of the present invention of FIG. 1.

Referring now to FIG. 4 showing a fourth diagram illustrating central processing unit 150 and multi-sensor relay box 120 of vehicle alternative power system 100 according to an embodiment of the present invention of FIG. 1.

Multi-sensor relay box 120 may comprise a sensor circuit for receiving a proportional voltage from battery(s) 110, alternator 125, generator 130, first motor 140, and second motor 145. Software control program 155 of central processing unit 150 receives the proportional voltage from multi-sensor relay box 120 and is programmed to adjust control voltage and current through the system components to a corresponding sensor circuit 165 of multi-sensor relay box 120. Software control program 155 is designed to evaluate the system electrical loads in relation to a charging rate and a storage level condition. Software control program 155 is preprogrammed to prioritize the system electrical loads according to a safety level and a component criticality.

vehicle alternative power system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle alternative power system comprising:
   an ignition switch;
   at least one battery;
   a regulator;
   a multi-sensor relay box;
   an alternator;
   a generator;
   a coil;
   a first motor and a second motor; and
   a central processing unit having a software control program;
   wherein said central processing unit is in communication with said ignition switch, said at least one battery, said regulator, said multi-sensor relay box, said alternator, said generator, said coil, said first motor, and said second motor
   wherein said ignition switch is structured and arranged to provide electrical power stored in said at least one battery to said regulator, said multi-sensor relay box, said alternator, said generator, said coil, and said first motor;
   wherein said regulator is adapted to regulate a voltage to said first motor and said accessories;
   wherein said multi-sensor relay box is adapted to receive at least one voltage level signal from said at least one battery, said alternator, said generator, said first motor, and said second motor and to transmit a proportional said at least one voltage level signal to said central processing unit for comparison to system current requirements and an allocation of an electrical charge level and an electrical storage reserve;
   wherein said first motor is adapted to power said alternator;
   wherein said alternator is adapted to provide a voltage to said generator and to said at least one battery for storage as determined via said central processing unit;
   wherein said generator is designed to receive a voltage from said alternator and increase said voltage value to said coil;
   wherein said coil is adapted to receive an increased voltage value from said generator and to transform said increased voltage value to a required voltage value as determined by said central processing unit and to transmit said required voltage value to said second motor;
   wherein said second motor is adapted to rotate said transmission at a velocity that is determined via said central processing unit and via a user of a vehicle having said vehicle alternative power system; and wherein said vehicle alternative power system is useful for powering an electric vehicle with a high degree of efficiency such that a petroleum based fuel is not needed for assisting the operation thereof, and for reducing a frequency of a recharging of said at least one battery.

2. The vehicle alternative power system of claim 1 wherein said at least one battery comprises a high capacity storage battery bank.

3. The vehicle alternative power system of claim 1 wherein said multi-sensor relay box comprises a sensor circuit for receiving a proportional voltage from said at least one battery, said alternator, said generator, said first motor, and said second motor.

4. The vehicle alternative power system of claim 1 wherein said software control program of said central processing unit receives at least one said proportional voltage from said multi-sensor relay box and is programmed to adjust a control voltage and a current to a system component to a corresponding said sensor circuit of said multi-sensor relay box.

5. The vehicle alternative power system of claim 1 wherein said first motor rotates said alternator and said generator for generating said power for storage and for an operation of said second motor.

6. The vehicle alternative power system of claim 1 wherein said central processing unit is adapted to proportionately increase a current and a voltage of an operating system voltage requirement and to proportionately decrease a storage current as a system electrical load increases.

7. The vehicle alternative power system of claim 1 wherein said first motor further
    comprises at least one pulley and at least one drive belt for providing a rotational power to said generator and said alternator.

8. The vehicle alternative power system of claim 1 when said ignition switch is rotated to an off position, all said power ceases to be generated and said power is diverted to at least one cooling fan to dissipate a residual said voltage.

9. The vehicle alternative power system of claim 1 wherein said regulator is able to regulate a voltage from said battery to said first motor and wherein said regulator is able to regulate a voltage generated by said first motor to said at least one battery.

10. The vehicle alternative power system of claim 1 wherein said battery, said first motor, said alternator, said generator, and said second motor each comprise at least one said sensor and a corresponding said relay.

11. The vehicle alternative power system of claim 1 wherein said regulator transfers said current to power said first motor and said vehicle accessories.

12. The vehicle alternative power system of claim 1 wherein said second motor is direct coupled to said transmission.

13. The vehicle alternative power system of claim 12 wherein said second motor is a variable speed motor.

14. The vehicle alternative power system of claim 1 wherein said software control program is designed to evaluate said system electrical loads in relation to a charging rate and a storage level condition.

15. The vehicle alternative power system of claim 14 wherein said software control program is preprogrammed to prioritize said system electrical loads according to a safety level and a component criticality.

16. The vehicle alternative power system of claim 1 wherein a low said storage level condition and a charging rate is less than said system current requirement, said software control program is adapted to limit a current being supplied to a lowest priority user first.

17. The vehicle alternative power system of claim 1 wherein said lowest priority user is a non-essential said component.

18. A vehicle alternative power system comprising:
    an ignition switch;
    at least one battery;
    a regulator;
    a multi-sensor relay box;
    an alternator;
    a generator;
    a coil;
    a first motor and a second motor; and
    a central processing unit having a software control program;
    wherein said central processing unit is in communication with said ignition switch, said at least one battery, said regulator, said multi-sensor relay box, said alternator, said generator, said coil, said first motor, and said second motor;
    wherein said ignition switch is structured and arranged to provide electrical power stored in said at least one battery to said regulator, said multi-sensor relay box, said alternator, said generator, said coil, and said first motor;
    when said ignition switch is rotated to an off position, all said power ceases to be generated and said power is diverted to at least one cooling fan to dissipate a residual said voltage;
    wherein said multi-sensor relay box comprises a sensor circuit for receiving a proportional voltage from said at least one battery, said alternator, said generator, said first motor, and said second motor;
    wherein said regulator is adapted to regulate a voltage to said first motor and said accessories;
    wherein said regulator is able to regulate a voltage from said battery to said first motor and wherein said regulator is able to regulate a voltage generated by said first motor to said at least one battery;
    wherein said regulator transfers said current to power said first motor and said vehicle accessories;
    wherein said multi-sensor relay box is adapted to receive at least one voltage level signal from said at least one battery, said alternator, said generator, said first motor, and said second motor and to transmit a proportional said at least one voltage level signal to said central processing unit for comparison to system current requirement and an allocation of an electrical charge level and an electrical storage reserve;
    wherein said battery, said first motor, said alternator, said generator, and said second motor each comprise at least one said sensor and a corresponding said relay;
    wherein said central processing unit is adapted to proportionately increase a current and a voltage of an operating system voltage requirement and to proportionately decrease a storage current as a system electrical load increases;
    wherein said software control program of said central processing unit receives at least one said proportional voltage from said multi-sensor relay box and is programmed to adjust a control voltage and a current to a system component to a corresponding said sensor circuit of said multi-sensor relay box;
    wherein said software control program is designed to evaluate said system electrical loads in relation to a charging rate and a storage level condition;

wherein said at least one battery comprises a high capacity storage battery bank;

wherein said software control program is preprogrammed to prioritize said system electrical loads according to a safety level and a component criticality;

wherein a low said storage level condition and a charging rate is less than said system current requirement, said software control program is adapted to limit a current being supplied to a lowest priority user first;

wherein said lowest priority user is a non-essential said component;

wherein said first motor is adapted to power said alternator;

wherein said first motor rotates said alternator and said generator for generating said power for storage and for an operation of said second motor;

wherein said first motor further comprises at least one pulley and at least one drive belt for providing a rotational power to said generator and said alternator;

wherein said alternator is adapted to provide a voltage to said generator and to said at least one battery for storage as determined via said central processing unit;

wherein said generator is designed to receive a voltage from said alternator and increase said voltage value to said coil;

wherein said coil is adapted to receive an increased voltage value from said generator and to transform said increased voltage value to a required voltage value as determined by said central processing unit and to transmit said required voltage value to said second motor;

wherein said second motor is adapted to rotate said transmission at a velocity that is determined via said central processing unit and via a user of a vehicle having said vehicle alternative power system;

wherein said second motor is direct coupled to said transmission;

wherein said second motor is a variable speed motor;

wherein said vehicle alternative power system is useful for powering an electric vehicle with a high degree of efficiency such that a petroleum based fuel is not needed for assisting the operation thereof, and for reducing a frequency of a recharging of said at least one battery.

19. A combination of a vehicle alternative power system and a vehicle of comprising:
  a.) A vehicle alternative power system comprising:
    an ignition switch;
    at least one battery;
    a regulator;
    a multi-sensor relay box;
    an alternator;
    a generator;
    a coil;
    a first motor and a second motor; and
    a central processing unit having a software control program;
    wherein said central processing unit is in communication with said ignition switch, said at least one battery, said regulator, said multi-sensor relay box, said alternator, said generator, said coil, said first motor, and said second motor
    wherein said ignition switch is structured and arranged to provide electrical power stored in said at least one battery to said regulator, said multi-sensor relay box, said alternator, said generator, said coil, and said first motor;
    wherein said regulator is adapted to regulate a voltage to said first motor and said accessories;
    wherein said multi-sensor relay box is adapted to receive at least one voltage level signal from said at least one battery, said alternator, said generator, said first motor, and said second motor and to transmit a proportional said at least one voltage level signal to said central processing unit for comparison to system current requirement and an allocation of an electrical charge level and an electrical storage reserve;
    wherein said first motor is adapted to power said alternator;
    wherein said alternator is adapted to provide a voltage to said generator and to said at least one battery for storage as determined via said central processing unit;
    wherein said generator is designed to receive a voltage from said alternator and increase said voltage value to said coil;
    wherein said coil is adapted to receive an increased voltage value from said generator and to transform said increased voltage value to a required voltage value as determined by said central processing unit and to transmit said required voltage value to said second motor;
    wherein said second motor is adapted to rotate said transmission at a velocity that is determined via said central processing unit and via a user of a vehicle having said vehicle alternative power system; and
    wherein said vehicle alternative power system is useful for powering an electric vehicle with a high degree of efficiency such that a petroleum based fuel is not needed for assisting the operation thereof, and for reducing a frequency of a recharging of said at least one battery
  b.) a vehicle comprising:
    a framework having a suspension system, and a plurality of rotatably attached wheels, wherein said framework with said plurality of rotatably attached wheels is structured and arranged to be able to roll along a ground surface;
    a steering system, wherein said steering system is attached to said framework and adapted to allow a user to be able to control a direction of travel of said framework during movement;
    a transmission, wherein said transmission is operably mounted to said framework such that a rotational motion applied to an input of said transmission is thereby transferred to at least one wheel to cause said framework with said wheels to roll along said ground surface;
    a braking system, wherein said braking system is adapted to allow a user to slow and to stop a movement of said vehicle along said ground surface;
    a body having an interior volume, wherein said interior volume of said body is suitable for an occupancy of said user for controlling a speed and a travel direction of said vehicle; and
    wherein said vehicle integrated with said vehicle alternative power system is able to provide a transportation for said user at a greatly reduced operating cost while substantially eliminating an environmental contamination.

* * * * *